United States Patent
Clapper et al.

(10) Patent No.: US 6,882,716 B2
(45) Date of Patent: Apr. 19, 2005

(54) LOCAL CONTROL OF CALL FEATURES IN A TELEPHONE SYSTEM

(75) Inventors: Edward O. Clapper, Tempe, AZ (US); Kevin P. Gambil, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 455 days.

(21) Appl. No.: 09/820,564

(22) Filed: Mar. 28, 2001

(65) Prior Publication Data

US 2002/0141556 A1 Oct. 3, 2002

(51) Int. Cl.$^7$ .............................. H04M 1/00; H04M 3/42
(52) U.S. Cl. .................. 379/201.01; 379/161; 379/168; 379/184; 379/194; 379/195; 379/201.05; 379/201.12
(58) Field of Search ................................. 379/170, 184, 379/194, 195, 201.01, 201.05, 201.12, 202.01, 252, 377, 393, 1.01, 102.06, 157, 160, 161, 165, 167.01, 167.05, 167.11, 168; 455/513; 370/295, 389, 442, 489

(56) References Cited

U.S. PATENT DOCUMENTS

| | | | | | |
|---|---|---|---|---|---|
| 3,705,412 A | * | 12/1972 | Nakamura et al. | .......... | 370/295 |
| 4,401,847 A | * | 8/1983 | Schneider et al. | .......... | 379/1.01 |
| 4,435,622 A | * | 3/1984 | Grantland et al. | .......... | 379/393 |
| 4,459,434 A | * | 7/1984 | Benning et al. | ............ | 379/160 |
| 4,538,031 A | * | 8/1985 | Benning et al. | ....... | 379/102.06 |
| 4,554,411 A | * | 11/1985 | Armstrong | ............. | 379/102.06 |
| 4,757,496 A | * | 7/1988 | Bartholet et al. | ........... | 370/489 |
| 4,809,317 A | * | 2/1989 | Howe et al. | ............. | 379/93.09 |
| 4,899,372 A | * | 2/1990 | Wahi et al. | .................. | 379/184 |
| 4,899,381 A | * | 2/1990 | Lee | ............................ | 379/393 |
| 4,958,370 A | * | 9/1990 | Shimanuki | ................... | 379/157 |
| 5,031,210 A | * | 7/1991 | Taniguchi | .................... | 379/165 |
| 5,179,588 A | * | 1/1993 | Nowicki | ...................... | 379/170 |
| 5,283,825 A | * | 2/1994 | Druckman et al. | ..... | 379/167.11 |
| 5,361,299 A | * | 11/1994 | Izumi | ........................ | 379/252 |
| 5,444,772 A | * | 8/1995 | Coker | ........................ | 379/161 |
| 5,566,233 A | * | 10/1996 | Liu | ........................ | 379/167.05 |
| 5,594,788 A | * | 1/1997 | Lin et al. | ............... | 379/167.11 |
| 5,937,058 A | * | 8/1999 | Bleile et al. | ................. | 379/377 |
| 5,978,469 A | * | 11/1999 | Benson | ........................ | 379/377 |
| 5,991,634 A | * | 11/1999 | Hui et al. | ................... | 455/513 |
| 6,088,362 A | * | 7/2000 | Turnbull et al. | ............ | 370/442 |

* cited by examiner

Primary Examiner—Harry S. Hong
(74) Attorney, Agent, or Firm—Fish & Richardson P.C.

(57) ABSTRACT

A residential phone system allows for local control of call features from any phone extension. The phone system may include a microcontroller that communicates along the phone lines at a non-utilized frequency to several extension phones in a residence. The microcontroller permits each phone to control call features such as call waiting, conference calling, paging, or other features. A control box may be included at any or all of the extension phones to provide a convenient user interface to access the call features.

26 Claims, 5 Drawing Sheets

LOCAL CONTROL OF CALL FEATURES IN A TELEPHONE SYSTEM

TECHNICAL FIELD

This invention relates to telephone systems, and more particularly to local control of call features in a telephone system.

BACKGROUND

Telephone service providers are providing a wide variety of advanced features to the residential customer in addition to standard telephone service. These features include, among others, three-way calling, call waiting, and caller-identification. Typically, a residential customer selects which advanced features they would like, and the features are then activated by the service provider for the entire residence.

Even with advanced features, the typical residential customer has a relatively unsophisticated telephone system. In a typical residential system, a main phone line is run to the house. Although additional phone jacks may be located throughout the house, each of the additional phone jacks are simply extensions, or duplicates, of the main line. The control of any telephone feature typically is limited to the original selection from the service provider.

DESCRIPTION OF DRAWINGS

These and other features and advantages of the invention will become more apparent upon reading the following detailed description and upon reference to the accompanying drawings.

DETAILED DESCRIPTION

Figure 1:
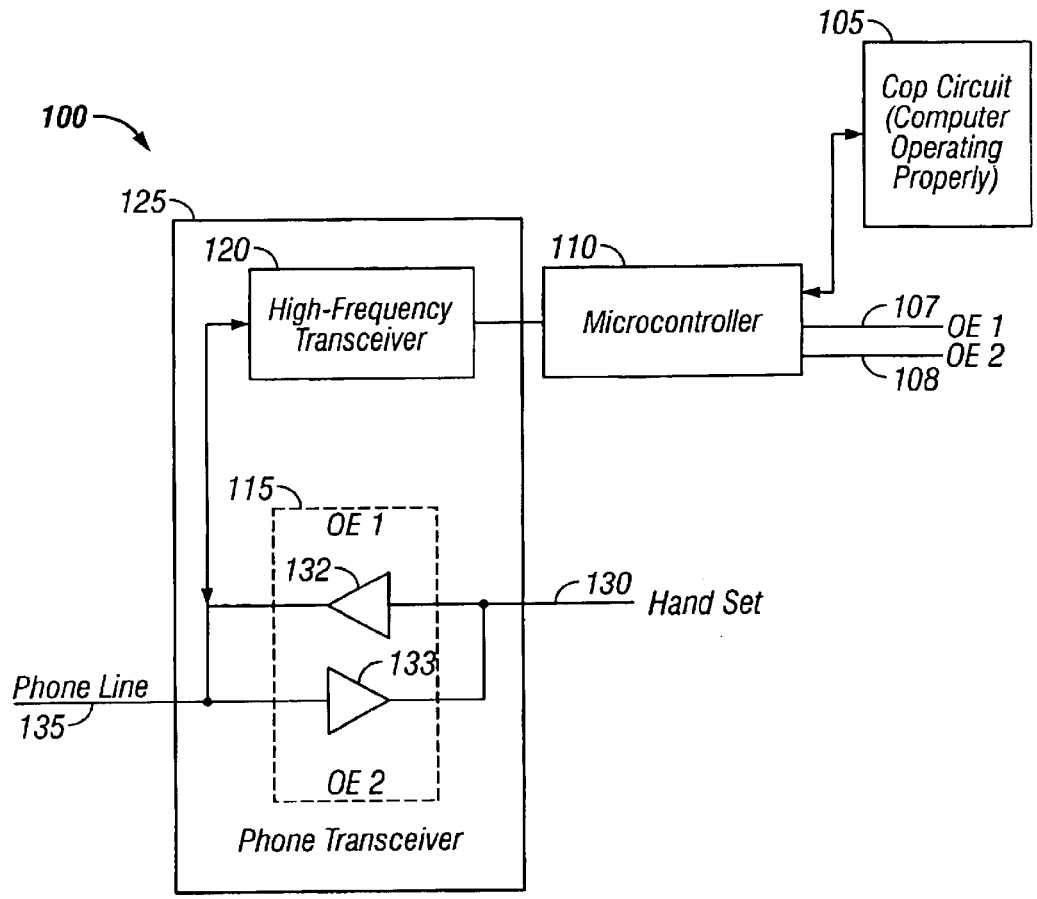
FIG. 1 is a block diagram illustrating the local phone system according to one embodiment of the present invention.

FIG. 1 is a block diagram illustrating an embodiment of the local phone system 100. The phone system 100 includes a microcontroller 110, a computer operating properly (COP) circuit 105, a high frequency transceiver 120, a phone transceiver 125, a phone line 135, and a hand set 130. The microcontroller 110 performs the processing necessary to implement the controls for the phone system 100. The instructions may be software based, or may be firmware built into the microcontroller 110. The microcontroller 110 communicates with the COP circuit 105 to ensure proper operation of the microcontroller 110. The microcontroller 110 may periodically inform the COP circuit 105 that the microcontroller 110 is operating properly, such as by setting a flag in the COP circuit 105. The COP circuit 105 may reset the microcontroller 110 if the flag is not set within a predetermined period of time. Thus, if the microcontroller 110 locks up or stops functioning, the COP circuit 105 may reset the microcontroller 105.

The microcontroller 110 may include a plurality of inputs such as output enable 1 (OE1) 107 and output enable 2 (OE2) 108 for each phone transceiver 125 connected to the phone system 100. When either the OE1 107 or the OE2 input is high, the corresponding path is activated within the selected phone transceiver 125. This allows the microcontroller 110 to control the flow of communication within the phone transceiver 125. The microcontroller 110 and corresponding circuitry may be located at any location within the phone system 100, such as the termination box on a residence 115.

The high frequency transceiver 120 enables the microcontroller 110 to communicate on the same lines that voice data is carried. Voice data is typically carried in a low frequency range, and thus the control data may be simultaneously carried on the phone lines at a high frequency. The high frequency transceiver 120 uses a frequency that is not used by either voice communications or voice-over-data communications such as DSL. The high frequency transceiver 120 interfaces with the microcontroller 110 to place signals from the microcontroller 110 onto the phone lines and also receive signals from the phone lines to communicate to the microcontroller 110. The phone transceiver 125 allows voice data to be placed on the phone lines. Both the high frequency transceiver 120 and the phone transceiver 125 are connected to the phone lines 135. The phone transceiver 125 is also connected to a handset 130. The phone transceiver 125 may include directional controls 132, 133. The state of the output enable inputs 107, 108 to the microcontroller 110 may determine which of the directional controls 132, 133 is active.

Figure 2:
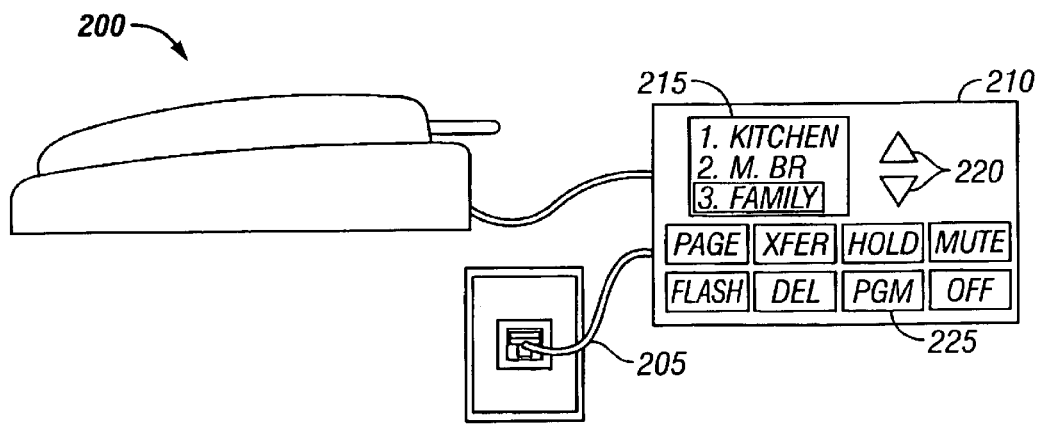
FIG. 2 illustrates a telephone connection according to one embodiment of the present invention.

FIG. 2 illustrates an embodiment of a telephone connection 200 that uses the phone system 100. The telephone connection 200 includes the phone transceiver 125 and handset 130, a line connector 205, and an optional location control center 210. The line connector 205 allows connection of the phone transceiver 125 to the phone line 135. The line connector 205 may use a standard phone connector, such as an RJ-11 jack. The optional control center 210 may be connected between the line connector 205 and the phone transceiver 125. The control center 210 may be used to more easily access the features of the phone system 100. The control center 210 may include a display 215, display controls 220, and control buttons 225. The display 215 may be used to show caller-id information in addition to information regarding the phone system 100. For example, the display 215 may contain a list of extension phones in the residence 115 and the status of each extension. The display controls 220 may be used to scroll to information not currently shown on the display 215. The control buttons may be used to activate individual features of the phone system 100, including hold, mute, transfer, paging, or conference. The control center 210 is designed to provide an easy interface to the phone system 100. However, it can be appreciated that the features of the phone system 100 may be accessed without the use of the control center 210, such as by using the keypad on the handset 130.

Figure 3A:
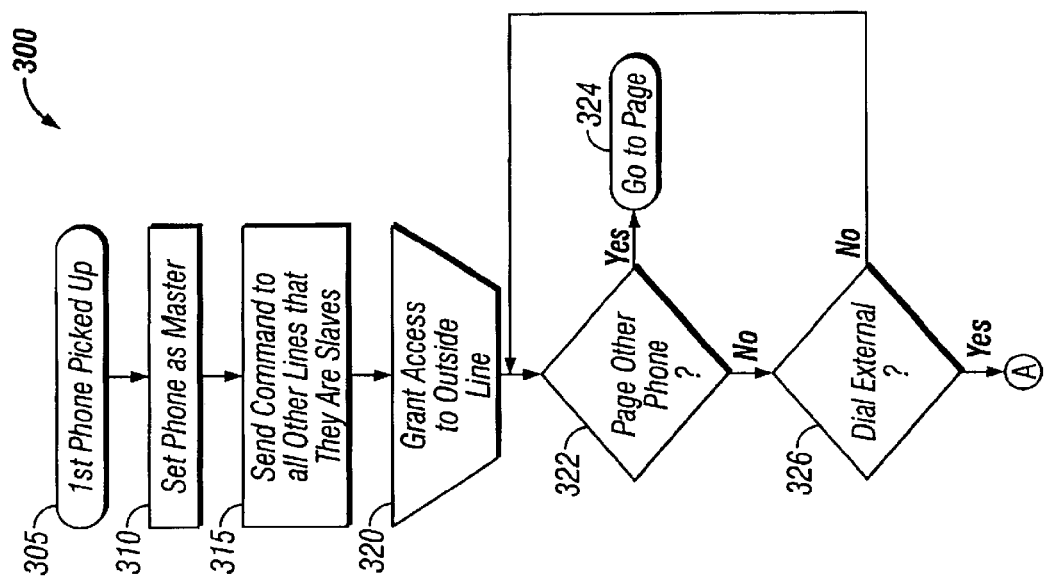
FIGS. 3a and 3b are flowcharts illustrating the master assignment procedure using according to one embodiment of the present invention.
Figure 3B:
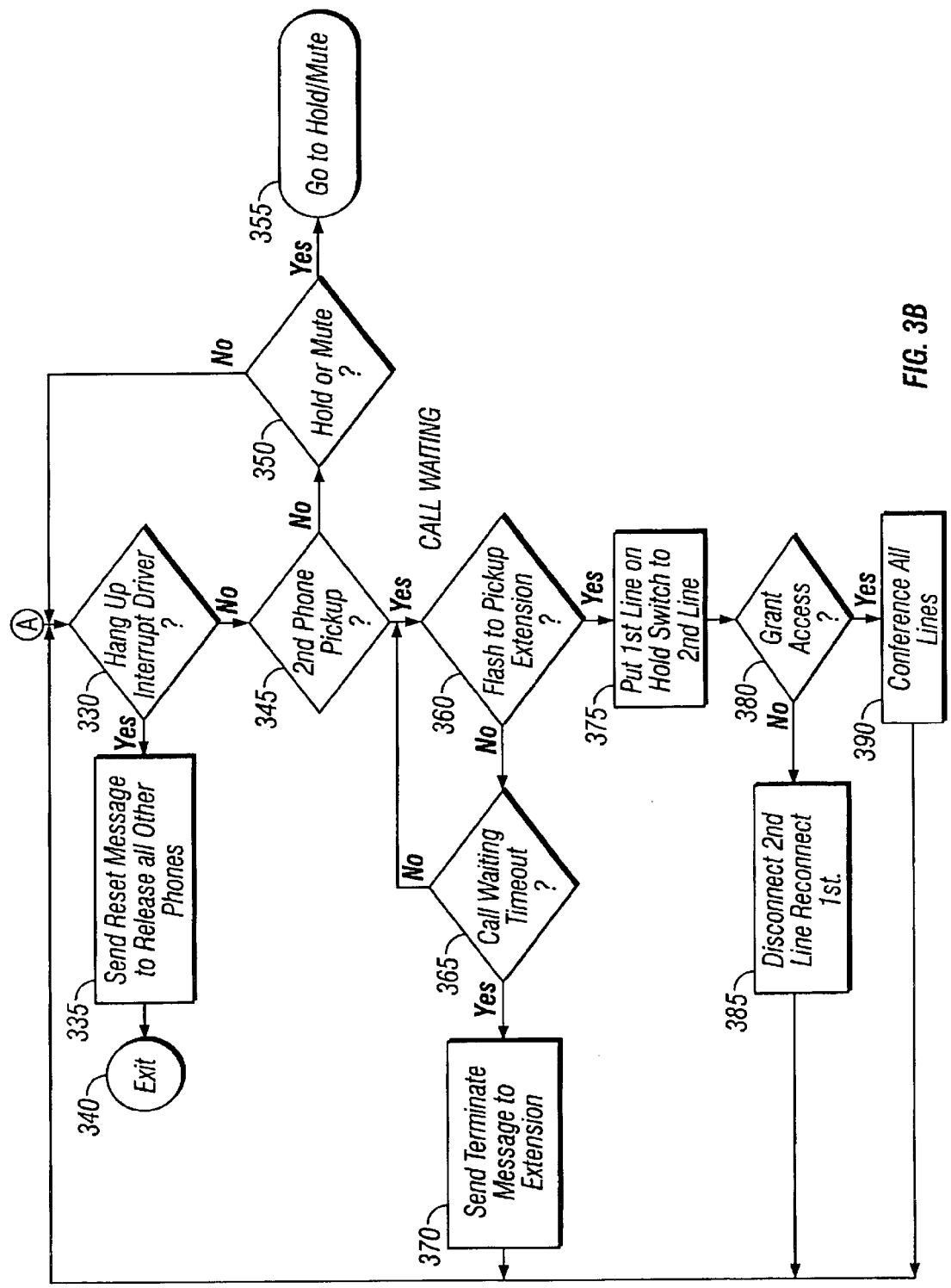

FIG. 3 is a flowchart illustrating one embodiment of the master assignment procedure 300 used in the phone system 100. The procedure 300 begins in block 305 when any extension phone is activated. The phone system 100 is flexible enough to allow any extension phone to activate the procedure. After the phone is activated, (typically by taking the phone off-hook), the phone is set as the master extension in block 310. Proceeding to block 315, the microcontroller 110 sends a command to all other extensions that they are to operate in the slave mode. Thus, the activated extension is now the master line, and the remaining lines are slaves to the activated extension.

Figure 5:
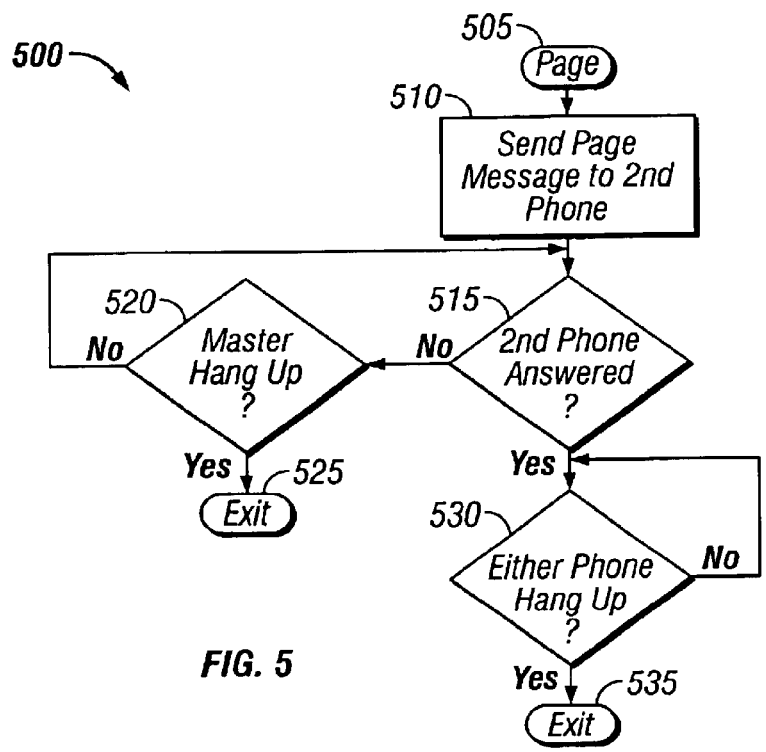
FIG. 5 is a flowchart illustrating the procedures used to page an extension phone according to one embodiment of the present invention.

Proceeding to block 320, access to an outside line is granted to the master extension in case the user wishes to dial an external line. The procedure 300 then proceeds to block 322, where the phone system 100 checks to determine if the master extension is to page another extension on the phone system. The master extension may indicate a desire to page another extension using the control center 210 or by using the handset 130. If the master extension does execute a page, the procedure proceeds along the YES branch to block 324. In block 324, the paging process 500 as described below with reference to FIG. 5 is activated.

Returning to block 322, if no internal page is requested, the procedure 300 proceeds along the NO branch to block 326. In block 326, it is determined whether the master extension is going to dial an external telephone number. If no external number is dialed, the process proceeds along the NO branch back to block 322. The master extension remains in a loop with blocks 322 and 326 until an action is indicated by the master extension.

Returning to block 326, if an external number is dialed, the process proceeds along the YES branch to block 330. In block 330, the phone system 100 connects the master extension to the external line and monitors the master extension for an interrupt indicating the master extension has been hung up. If a hang up is detected, the process proceeds along the YES branch to block 335. In block 335, the phone system 100 sends a reset message to all the extensions, indicating a release from the slave status. After receiving the reset message, any of the extensions may assume the status of master. The process then exits in block 340.

Figure 6:
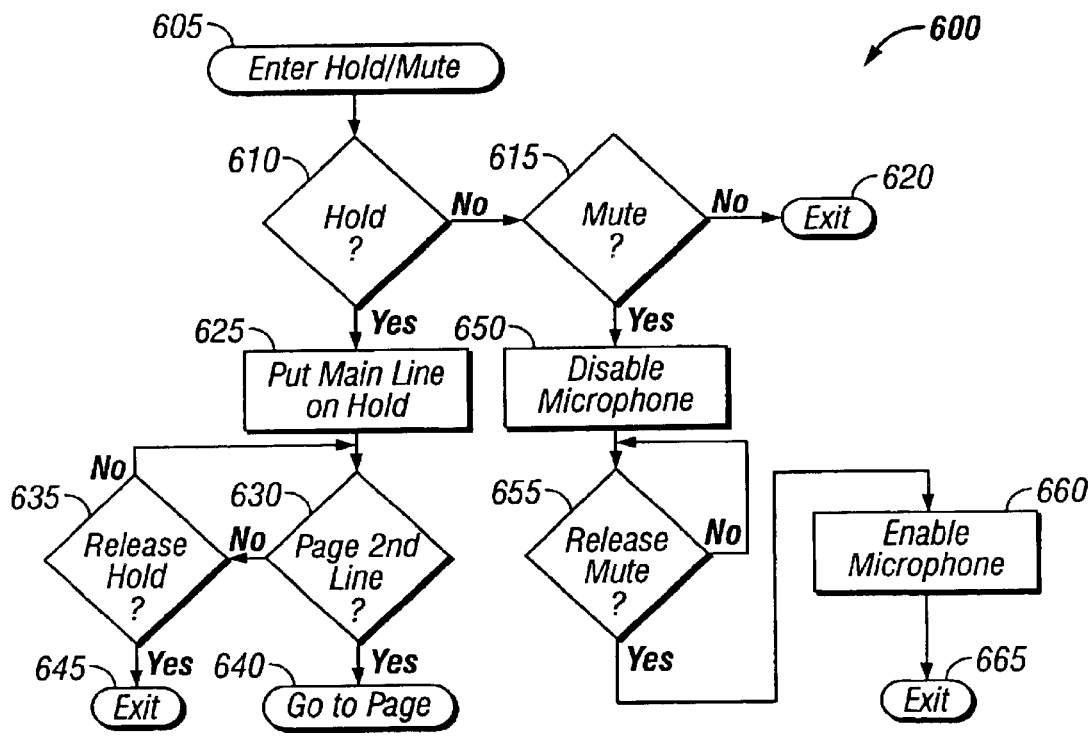
FIG. 6 is a flowchart illustrating the procedures used to place a phone on hold or mute according to one embodiment of the present invention.

Returning to block 330, if no hang up is indicated, the process proceeds along the NO branch to block 345. In block 345, the phone system 100 checks whether another extension is activated. If a second extension is not activated, the process proceeds along the NO branch to block 350. In block 350, the process determines whether the master extension has requested either the hold or mute be activated. If the hold or mute feature is activated, the process proceeds along the YES branch to block 355. In block 355, the hold/mute process 600 as described below with reference to FIG. 6 is activated. Returning to block 350, if neither the hold nor mute feature is activated, the process proceeds along the No branch back to block 330.

Returning to block 345, if an extension phone is activated, the process proceeds along the YES branch to block 360. In block 360, the master extension may be given a call waiting tone indicating that an extension line has been activated. Unlike a normal residential phone system, the extension line is not automatically connected to the phone line, but rather only to the master extension via the call waiting procedure. The user on the master extension may then decide whether to acknowledge or ignore the call waiting tone. If the tone is ignored, the process proceeds along the NO branch to block 365. In block 365, it is determined whether a sufficient amount of time has passed since the call waiting request was sent to the master extension. If the time has not elapsed, the process proceeds along the NO branch to return to block 360. If the time has elapsed, the process proceeds along the YES branch to block 370. In block 370, a message is transmitted to the slave extension indicating the call waiting was refused, and the slave extension is deactivated. The process then returns to block 330.

Returning to block 360, if the master extension does acknowledge the call waiting tone by flashing over, the process proceeds along the YES branch to block 375. In block 375, the first line is placed on hold and the master extension switches to the second line, connecting the master extension to the slave extension. In this block, the user of the master extension may carry on a private conversation with the user of the slave extension and determine why the extension was activated. Thus, if the person on the slave extension wanted to use the phone, the user of the master extension may inform them to try later. The user of the master extension may also decide to allow the slave extension to join the conversation.

The process proceeds to block 380, where the user of the master extension determines whether to grant the slave extension access to the first line. If access is denied, the process proceeds along the NO branch to block 385. In block 385, the master extension disconnects from the slave extension and reconnects to the first line. The process then returns to block 330. Returning to block 380, if the master extension grants access to the slave extension, the process proceeds along the YES branch to block 390. In block 390, all the lines are conferenced together. The process then returns to block 330.

Figure 4:
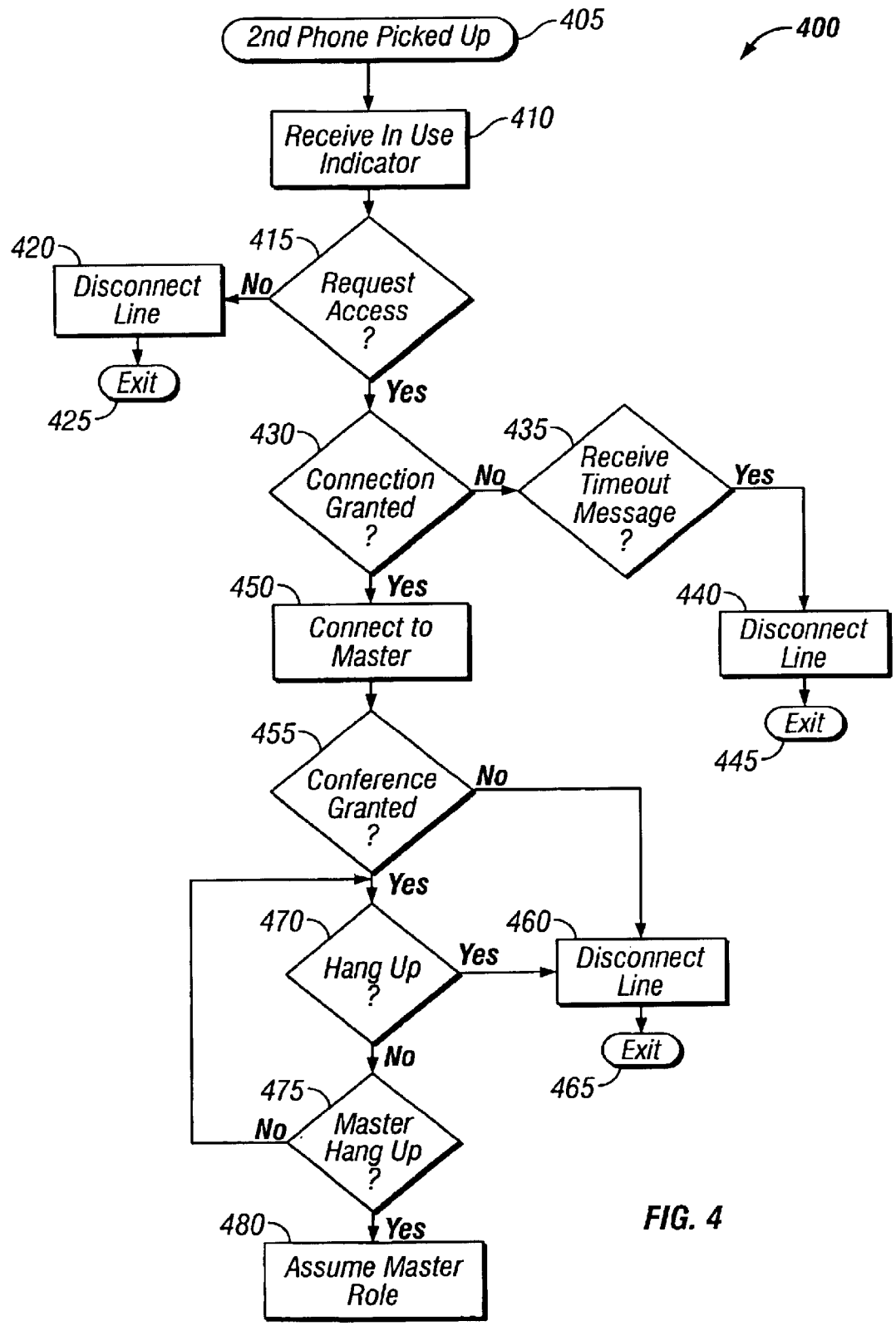
FIG. 4 is a flowchart illustrating the logic flow when an extension phone is used according to one embodiment of the present invention.

FIG. 4 is a flowchart illustrating the process 400 carried out by an extension phone according to one embodiment when the extension phone is activated in the slave condition. The process 400 begins in block 405 when the extension phone is activated, typically by lifting the handset from the cradle. Because another phone in the residence is also active and designated as the master, the extension phone assumes the role of slave. Proceeding to block 410, the extension phone receives an indication that another phone is in use. This indication may be in many forms, including a visual display on the control center 210, an indicator light on the extension phone, an audio signal from the extension phone, or other method of indication. The indication communicates to the user of the extension phone that the extension phone is in the slave configuration.

Proceeding to block 415, the extension phone requests access to the telephone line from the master phone. As stated above, this may be communicated to the master phone in the form of a call waiting indication. Other techniques may be used to request access, including transmitting a display message on the control center 210. If access is denied, the process 400 proceeds along the NO branch to block 420. In block 420, the extension phone is disconnected from the line, and the process 400 terminates in the END block 425.

Returning to block 415, if the request for access is granted, the process 400 proceeds along the YES branch to block 430. In block 430, the extension phone checks to see if a connection to the master phone is approved. Thus, if the master phone accepts the call waiting signal and flashes over to the extension phone, the connection to the master phone would be approved. If the connection not granted, the process 400 proceeds along the NO branch to block 435. In block 435, the extension phone determines if a predetermined amount of time to grant the connection has expired. The extension phone may receive a timeout message when the predetermined amount of time has elapsed. If the time has not expired, the process 400 proceeds along the NO branch back to block 430. If the time has expired, the process 400 proceeds along the YES branch to block 440. In block 440, the extension phone is disconnected from the line, and the process 400 terminates in the END block 445.

Returning to block 430, if the connection to the master phone is granted, the process 400 proceeds along the YES branch to block 450. In block 450, the extension phone is connected to the master phone. After this connection is established, the person on the master phone may talk with the person on the extension phone to determine what action to take. For example, the person on the extension phone may want to join in the existing conversation with the person on the master phone. The person on the extension phone may not want to join the existing call, but wants to make a new call. Because the person on the master phone line can hold a private conversation with the person on the extension line, the exact desires may be determined.

Proceeding to block 455, the process 400 determines whether the extension phone is conferenced in with the master phone. If the conference is not granted, the process 400 proceeds along the NO branch to block 460. In block 460, the extension phone is disconnected from the line, and the process 400 terminates in the END block 465. Returning to block 455, if the extension phone is conferenced in with the master phone, the extension phone participates in the current call, and the process 400 proceeds along the YES branch to block 470. The current call continues until one of the parties disconnects from the line. In block 470, the extension phone determines whether the remote caller disconnects from the phone line. If the remote caller does hang up, the process 400 proceeds along the YES branch to block 460. In block 460, the extension phone is disconnected from the line, and the process 400 terminates in the END block 465.

Returning to block 470, if the remote caller does not hang up, the process 400 proceeds along the NO branch to block 475. In block 475, the extension phone determines whether the master phone line disconnects. If the master phone line does not disconnect, the conference call continues, and the process 400 proceeds along the NO branch back to block 470. If the master phone line does disconnect, the process 400 proceeds along the YES branch to block 480. In block 480, the extension phone assumes the role of master phone and continues the call.

FIG. 5 is a flowchart illustrating the process 500 according to one embodiment used to page an extension phone. The process 500 begins in block 505 with a request for a page. For example, if someone in the kitchen wants to page a person in the den, the page request would be sent by the microcontroller 110 over the phone line.

Proceeding to block 510, the page message is sent to the requested extension phone. The page message is sent by the microcontroller 110 and the high frequency transceiver 120 over the phone lines. The page request would cause the phone in the den to ring.

Proceeding to block 515, the process 500 checks to determine if the extension phone is answered. If the phone is not answered, the process 500 proceeds along the NO branch to block 520. In block 520, the process 500 determines whether the master phone has hung up. If the master phone hangs up before the extension phone answers, the process proceeds along the YES branch and terminates in EXIT block 525. Returning to block 520, if the master phone stays on the line, the process 500 proceeds along the NO branch back to block 515. In block 515, if the extension phone is answered, the master phone and the extension phone are connected and may conduct a conversation. Thus, the person in the kitchen is able to call the person in the den. This allows someone to transfer calls and communicate throughout the residence from any phone line.

Proceeding to block 530, the process 500 determines whether either phone terminates the call by hanging up. If no hang up is detected, the conversation continues and the process proceeds along the NO branch in a loop back to block 530. If either phone terminates the call, the process 500 proceeds along the YES branch to terminate in the EXIT block 535.

FIG. 6 is a flowchart illustrating the process 600 used according to one embodiment to place a phone on hold or mute. The process 600 begins with a request to enter the hold/mute state in block 605. Proceeding to block 610, the process 600 determines whether the hold feature is requested. If the hold feature is requested, the process 600 proceeds along the YES branch to block 625. In block 625, the main line is placed on hold. While the main line is on hold, the process 600 proceeds to block 630 to determine whether a page request is being sent to a second line. If the page request was made, the process 600 proceeds along the YES branch to block 640, where the phone line goes to the page function as described above with reference to FIG. 5. Returning to block 630, if no page request is made, the process 600 proceeds along the NO branch to block 635. In block 635, the process 600 checks whether the main line is released from being on hold. If the hold is released, the main line is reconnected and the process 600 proceeds along the YES branch to terminate in the EXIT block 645. If the hold is not released, the process 600 continues in a loop along the NO branch back to block 630.

Returning to block 610, if no hold function is requested, the process 600 proceeds along the NO branch to block 615. In block 615, the process 600 determines if the mute feature is requested. In the mute feature is not requested, the process 600 proceeds along the NO branch to terminate in block 620. If the mute feature is requested, the process 600 proceeds along the YES branch to block 650. In block 650, the microphone of the handset is disabled, thus putting the phone in the mute mode. If a speakerphone feature is being used, the speakerphone microphone is also disabled.

Proceeding to block 655, the process 600 determines if the mute feature is released. If the mute feature is not released, the process 600 proceeds along the NO branch in a loop back to block 655. If the mute feature is released, the process 600 proceeds along the YES branch to block 660. In block 660, any microphones that were disabled in block 650 are enabled. This take the phone out of the mute mode, and the process 600 terminates in EXIT block 665.

Numerous variations and modifications of the invention will become readily apparent to those skilled in the art. Accordingly, the invention may be embodied in other specific forms without departing from its spirit or essential characteristics.

What is claimed is:

1. A method of locally controlling call features comprising:

signaling a request for a call feature from a first telephone over a phone line;

processing the request in a processing element which is separate from and remote from said first telephone, by automatically setting said first telephone which signaled the request am a master controller which can send commands, detecting a command from another telephone, other than said master, and setting said another telephone as a slave telephone which receive commands from the master;

detecting a call feature request from said slave telephone; and determining, in the master telephone, whether to grant access to the slave telephone in response to the request, and to command the slave telephone, over the phone line.

2. The method of claim 1, wherein said detecting a call feature comprises requests for a call feature, at a frequency not used for voice or voice-over-data communications.

3. The method of claim 1, further comprising automatically resetting assignment of master and slave after a predetermined time of inactivity.

4. The method of claim 1, further comprising paging the slave phone from the master phone.

5. The method of claim 1, further comprising conferencing the slave phone with the master phone.

6. The method of claim 1, further comprising placing the phone line on hold.

7. A method of processing call features comprising:

submitting a request for a call feature from a first phone extension to a local controller which is separate from said first phone;

automatically designating the first phone as a master which can send commands;

receiving a request for a call feature from another telephone;

designating said another telephone as a slave telephone which receives commands from the master;

determining in the master whether to grant the call feature to the slave; and transmitting instructions regarding the call feature over the local phone lines at a frequency not used for voice or voice-over-data communications.

8. The method of claim 7, wherein there are a plurality of slave phones, and further comprising transmitting a call waiting request to the master phone if any slave phone is activated.

9. The method of claim 8, further comprising conferencing a slave phone which has been activated with the master phone in response to the call waiting request.

10. The method of claim 7, further comprising placing the master phone on hold.

11. The method of claim 7, further comprising paging a slave phone from the master phone.

12. A local phone system comprising:

a controller which receives requests for call features from a plurality of phone extensions, wherein the controller processes the requests and transmits instructions to the phone extensions based on the requests and which automatically designates a last phone that makes a request as a master phone when no other phone is already a master phone, that can grant requests made by all other phones, and which other phones are designated as slave phones; and a first transceiver which provides communications between the controller and the phone extensions over a phone line.

13. The local phone system of claim 12, further comprising a second transceiver used for voice communications.

14. The local phone system of claim 13, wherein the first transceiver operates at a different freguency than the second transceiver.

15. The local phone system of claim 12, wherein the call features include call waiting.

16. The local phone system of claim 12, wherein the call features include conference calling.

17. The local phone system of claim 12, wherein the call features include paging.

18. The local phone system of claim 12, wherein the call features include call holding.

19. The local phone system of claim 12, wherein the call features are accessed through the phone handsets.

20. The local phone system of claim 12, further comprising a control center connected to at least one phone extension, wherein the control center provides a user interface to access the call features.

21. The method as in claim 1, wherein said call feature request received from the slave telephone comprises taking the slave telephone off-hook.

22. The method as in claim 21, wherein said call feature request is a request to use an outside line.

23. A method as in claim 7, wherein said request for a call feature comprises taking the slave telephone off-hook.

24. The method of claim 23, wherein said call feature request is a request to use an outside line.

25. The system as in claim 12, wherein the request includes an action of taking a telephone off-hook.

26. A system as in claim 25, wherein the request includes requesting an outside line.

* * * * *

UNITED STATES PATENT AND TRADEMARK OFFICE
CERTIFICATE OF CORRECTION

PATENT NO. : 6,882,716 B2
DATED : April 19, 2005
INVENTOR(S) : Edward O. Clapper and Kevin P. Gambill It is certified that error appears in the above-identified patent and that said Letters Patent is hereby corrected as shown below:

<u>Title page,</u>
Item [75], Inventor, please correct the spelling of inventor's name to read as follows:
-- Kevin P. Gambill --

Signed and Sealed this

Ninth Day of August, 2005

JON W. DUDAS
*Director of the United States Patent and Trademark Office*